FILM MOUNTING ASSEMBLY

Filed Jan. 13, 1966

Sheet 1 of 2

INVENTORS
THOMAS P. ANDERSON
ROBERT BEISPEL

BY Hill, Sherman, Meroni, Gross & Simpson ATTORNEYS

Feb. 25, 1969 T. P. ANDERSON ET AL 3,429,101

FILM MOUNTING ASSEMBLY

Filed Jan. 13, 1966

INVENTORS
THOMAS P. ANDERSON
ROBERT BEISPEL

BY Hill, Sherman, Meroni, Gross & Simpson ATTORNEYS

United States Patent Office 3,429,101

Patented Feb. 25, 1969

3,429,101

FILM MOUNTING ASSEMBLY

Thomas P. Anderson, Hubbard Woods, and Robert Beispel, Skokie, Ill., assignors to Microseal Corporation, Chicago, Ill., a corporation of Illinois Filed Jan. 13, 1966, Ser. No. 520,382

U.S. Cl. 53—255 14 Claims

Int. Cl. B65b 5/00, 55/00, 63/00

ABSTRACT OF THE DISCLOSURE

A film mounting assembly for mounting cut pieces of microfilm into microfilm receiving pockets formed in film record cards and including guide tongues for guiding the cut piece of microfilm into the record card pocket and means for moving the cut film piece along a channel in the mounting assembly and between the tongues.

The present invention is directed to an improved film mounting assembly for feeding cut microfilm segments into the pockets of film record cards.

Statistical microfilm cards are now in widespread use throughout the country. These cards come in many different forms, sizes, and shapes, depending upon the uses for which they are designed but a large number of these cards are of the so-called suspension-carrier type wherein a strip or cut segment of microfilm is carried within a pocket formed in the statistical card itself. In most cases, the so-called film pockets are defined by a pair of very thin transparent plastic films or enveloping members which lie along the opposed surfaces of the record card and over apertures cut in the card. The films are bonded to the respective surfaces of the card around the cutout aperture formed in the card but one access opening is generally provided between one unsecured edge of at least one of the enveloping members and the adjacent underlying surface of the record card.

In many cases these cards are of the general type illustrated in the drawings wherein a portion of the card is utilized for storing cut microfilm segments while another portion of the card is of the usual heavy paper stock suitable for storing a large quantity of statistical data either through magnetic ink impressions on the opposed surfaces of the card or by way of the common key-punch process.

In the ordinary case, various pieces of microfilm are inserted within the pockets of the record card and then statistical data is stored on the remaining part of the card, which data pertains to the matter contained within the microfilm segments.

In any event, whether a card is of the type above described or is of that type wherein the entire card is given over to the storage of cut microfilm segments, it is quite often desirable that a means and method be provided whereby various cut microfilm segments can be added to those already stored in the card pockets at some later date after the first film segments have been inserted into the card pockets. For instance, if the cards are being employed for the purpose of maintaining employee statistics, then or an annual or some other fixed periodic basis, it might be desirable to microfilm a performance report or the like and then place the small piece of microfilm containing the reduced image of that report within one of the pockets of the record card. Several such placements of cut film segments could be made within each pocket formed in the record card until all of the available pocket space were occupied. Record cards which are designed to receive a number of separate film segments rather than just a single film segment are referred to as additive-type storage cards.

While additive-type cards can be designed to be employed with varying sizes of film, the 16 mm. additive-type card is now finding the greatest acceptance in the market. When 16 mm. microfilm is segmented into individual frame segments, the resulting pieces are quite small and very difficult to handle. One problem that has arisen in connection with the use of additive-type cards, which problem is particularly critical when 16 mm. film is being fed into additive-type cards, is that of preventing one film segment from overriding another as it is being pushed into the record card pocket.

The most satisfactory film mounting assemblies to date are designed to operate on the principle of film pushing film wherein the leading edge of one film segment abuts the trailing edge of the next preceding film segment and pushes the latter along in front of it. When such an apparatus is used in an additive-type card, it is important that means be provided to insure that the leading edge of one film segment will contact the trailing edge of another and push it along within the film pocket so that the one film segment does not override the other. In this connection it will be understood that a film segment mounted within a record card pocket already lies in a position substantially coplanar with the record card so that in order to provide the desired relationship means must be provided for directing the leading edge of a cut film segment down into the pocket into abutting relation with any film which may already be present within the pocket.

Still further, since record cards are generally designed with thicknesses somewhat greater than the thickness of the microfilm carried thereby, it will readily be understood that means must be provided to prevent the leading edge of the "pusher" film from losing contact with the trailing edge of the pushed film segment once the trailing edge of the latter has passed the edge of the aperture. If no such means is provided, then it is possible for the pushed film segment to drop into the aperture once its trailing edge has passed the edge of the aperture and the so-called "pusher" film segment then overrides the pushed film. Such a circumstance is undesirable inasmuch as the pushed film segment will be left immediately adjacent the access opening to the film pocket and any subsequently added films will simply drop down on top of that first film segment.

A film mounting assembly constructed in accordance with the principles of the present invention provides a means for feeding a rolled elongated strip of microfilm along a film track and for cutting segments of microfilm from that elongated film strip at any desired point and then for feeding the cut film segment into a record card pocket. A pair of tongues are empoyed to obviate the disadvantageous characteristics described above and to guide the microfilm segment into its proper position within the record pocket. The tongues insure that the "pusher" film will not lose contact with the cut film segment and also insure that the cut film segment will be urged down into coplanar relationship with the card during the mounting operation. Still further, the tongues serve to expedite the opening of the access opening to the film pocket and to guide the cut film segment into the record card pocket without in any way tearing or damaging the thin transparent enveloping members.

Accordingly, it is a principal object of the present invention to provide an improved mounting assembly having means for guiding a cut film segment into position within the pocket of a film record card.

Another and more specific object of the invention is to provide a means for insuring that a "pusher" film will not lose contact with a cut film segment when that film segment is moved into the pocket of a film record card.

Yet another object of the invention resides in the provision of a novel means for guiding a cut film segment into a record card pocket and for insuring that the film segment will not damage the enveloping members defining the film pocket.

These and other objects, features, and advantages of the present invention will become apparent from time to time as the following specification proceeds, and with reference to the accompanying drawings, wherein.

Figure 4:
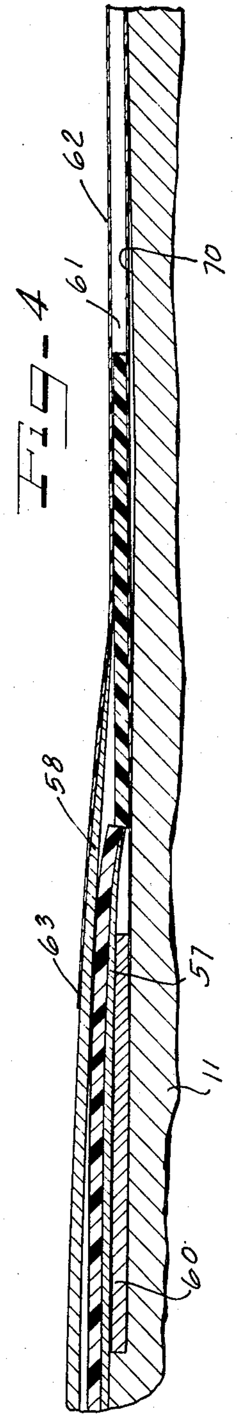
Figure 5:
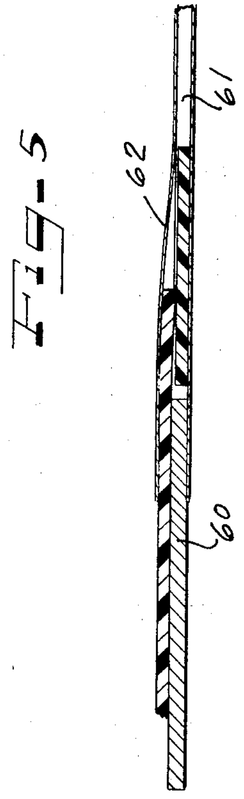

FIGURE 4 is a fragmentary vertical sectional view through one end of a film record card and through the tongues of the film mounting assembly showing how the tongues cooperate with the card to insure proper movement of a cut film segment into a record card pocket; and FIGURE 5 is a fragmentary vertical sectional view similar in nature to FIGURE 4 but showing what can happen if film insertion is attempted without the advantage of the tongues illustrated in FIGURE 4.

There is shown in the drawings a film mounting assembly 10 comprising a flat steel plate 11 having a transversely extending shoulder 65 extending thereacross and defining the recessed inner end portion 13 of a record card support or card bed 14. An elongated channel 15 is formed in the lefthand end of the plate 11 and the straight side edges of this channel are spaced apart a distance approximately equal to or very slightly greater than the width of a strip of 16 mm. microfilm to provide a guideway or track for feeding the microfilm along the surface of the plate 11. The channel 15 is recessed slightly from the surrounding surface of the plate 11 and has a pair of channel rails 16 and 17 extending thereover to define the upper limits of the guideway. The guide rails 16, 17 are fastened to the upper surface of the plate 11 and extend very slightly over the channel 15. The channel 15 is recessed from the surrounding surface of the plate 11 a distance very slightly greater than the thickness of a standard microfilm strip so that the channel rails 16, 17 in cooperation with the straight side edges of the channel 15 cooperate to provide a guideway for insuring the smooth movement of microfilm along the channel 15.

Figure 3:
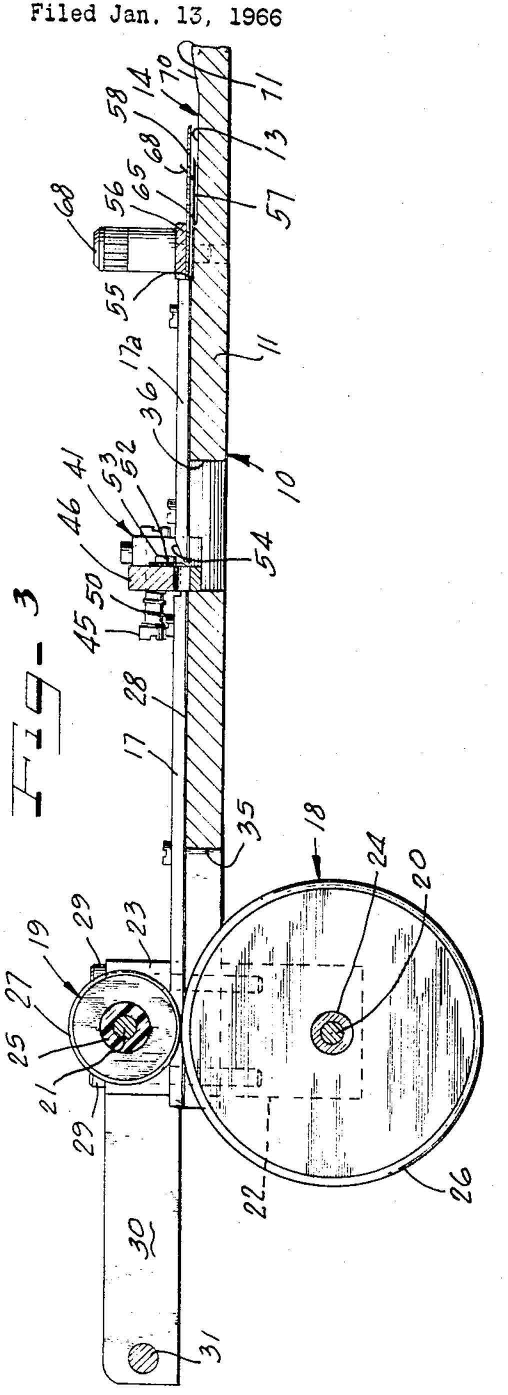
FIGURE 3 is a vertical sectional view through the film mounting assembly illustrated in FIGURE 1 and taken along lines III—III of FIGURE 1.

Large and small feed rolls 18 and 19, respectively, are fixed to mounting shafts 20 and 21, respectively, which shafts are journaled for rotatable movement in shaft blocks 22, 23. Plastic bushings 24, 25 are mounted on the shafts 20, 21, respectively, on opposite sides of the feed rolls 18 and 19 to properly transversely position the feed rolls on the mounting assembly for reasons which will hereinafter become apparent. The feed rolls 18, 19 have rubber rings 26, 27 carried in circumferential grooves formed in the outer faces of the rolls 18, 19 and these rubber rings are positioned in tangency with one another at a point substantially coplanar with the plane of the film guideway 28 as can be viewed in FIGURE 3.

The shaft blocks 22, 23 are secured to the plate 11 by long shank screws 29 which extend through the blocks 23 and thence through the plate 11 and into the blocks 22 lying on the under surface of the plate 11. It will also be observed that one of the blocks 23 lying on the upper surface of the plate 11 has an outwardly extending arm 30 formed integrally therewith and that this arm has a spindle shaft 31 extending transversely therefrom with the well-known reel retainer 32 pivotally mounted on the outer end thereof, to provide a means for mounting a reel 33 of microfilm on the film mounting assembly for rotatable movement about the shaft 31.

A knob 34 is fixedly mounted to the outer end of the elongated shaft 20 to provide a means for rotating that shaft and hence the tangentially oriented rolls 18, 19.

Film is preferably drawn off the reel 33 mounted on the shaft 31 from the top side of the reel so that the inherent curl of film tends to curl the leading edge down onto the upper surface of the plate 11. The film is drawn between the rolls 18, 19 and rotation of the knob 34 is effective to move the roll of film along the guideway or track 28 between the straight side edges of the channel 15 and beneath the guide rails 16, 17.

An aperture 35 is formed in the plate 11 at and around the point of tangency of the rolls 18, 19 and another elongated aperture 36 is formed through the plate 11 about half way along the guideway 28 and this aperture is formed for the purpose of permitting a light to be passed through the film carried in the guideway 28 so that an image can be projected on a screen.

The entire mounting assembly illustrated in the drawings appended hereto is designed to be used in conjunction with a microfilm viewer unit. In such cases, the plate 11 is fixedly mounted in the viewer unit so that a light can be passed up through the aperture 36 and thence through a frame of film lying over the aperture and thence through the optical system of the viewer whereby the image is finally shown on an enlarged screen.

A slitter assembly 40 is provided to permit cutting of the microfilm into a number of film segments so that the film segments can be inserted into the pockets of record cards. The slitter assembly comprises generally a pair of upstanding slitter blocks 41 and 42 which are secured within a transversely extending recess 43 formed in the upper surface of the plate 11 on both sides of the film guideway 28 by screws 44. A pivot pin 45 extends through the block 41 and serves as a pivot point for one end of a lever arm 46. The opposite far end of the lever arm has a knob 47 mounted thereon by means of which an operator can depress the distal end of the lever. A pin 48 extends through the block 42 and through an elongated slot 49 formed in the lever 46. The slot 49 is extended so as to permit pivotal movement of the lever 46 about the pin 45. Springs 50 and 51 are mounted on the pins 45 and 48 and extend between the headed ends of those pins and the side wall of the lever 46 whereby to hold the lever in snug engagement with the mating side walls of the blocks 41, 42.

A slitter blade 52 extends between the blocks 41, 42 and is positively secured to the lever 46 and is adapted to move down through the plane of the film guideway 28 to effect cutting of the film mounted in the guideway. The channel rails 16, 17 are broken at the point 53 to provide the separate channel pieces **16*a* and 17*a*. The channel pieces 16*a*, 17*a* otherwise comprise mere extensions of the rails 16, 17. The channel rails 16*a*, 17*a* have chamfered surfaces 54** which serve to permit the slitter blade to move freely to the cutting position without interference between the screws maintaining the slitter blade fast to the lever arm and the channel members themselves.

The upper surface of the plate 11 is slightly stepped as at 55 and a bar 56 extends across the plate 11 with its left handmost edge in abutting engagement with the stepped edge 55. The undersurface of the bar 56 is recessed to accommodate a pair of tongues 57 and 58 and a pair of card hold-down fingers 59.

The card hold-down fingers 59 are formed integrally with one another and comprise part of a single stamped metal piece which piece lies within the recess formed on the undersurface of the bar 56 and flat against the recessed portion of the plate 11 immediately adjacent the shoulder 55.

A shoulder 65 is formed transversely across the upper surface of the plate 11 to provide a recessed portion 66 of the plate which serves as the left handmost end of the card bed or card support. The shoulder 65 is coextensive with the right hand side wall of the bar 56 and serves as an abutment for the left handmost end of a film record card placed on the card support 14.

The tongues 57, 58 constitute an important part of the present invention and are each formed of thin, flexible, metal stock. The lower tongue 57 is formed integrally with the basal portion or main body of the thin stamping which has the arms 59 extending therefrom and this member has a thickness when lying on the surface intermediate shoulders 55, 65 such that the upper surface of the lower tongue 57 lies on or below the plane of the film guideway 28 so that film can move smoothly along the guideway and onto the upper surface of the tongue 57 without in any way catching on the rear edge of the tongue.

Spacers or shims may be placed on top of the basal portion of the lower tongue 57 on opposite sides of the film guideway 28 and then an upper tongue 58 is placed on top of these shims and extends outwardly over the lower tongue 57 and substantially beyond the end of the lower tongue. The shims should have a thickness equal to or greater than the thickness of the film movable through the guideway 28 so that progress of the film from the guideway and onto the upper surface of the lower tongue 57 will not be impeded.

Knurled screws 68 are provided to secure all these elements in place. These screws extend through the bar 56 and thence through the basal portion of the upper tongue 58, through the shims, and through the basal portion of the lower tongue 57 and hold-down arms 59 to secure all the parts in operational relation relative to one another.

Figure 1:
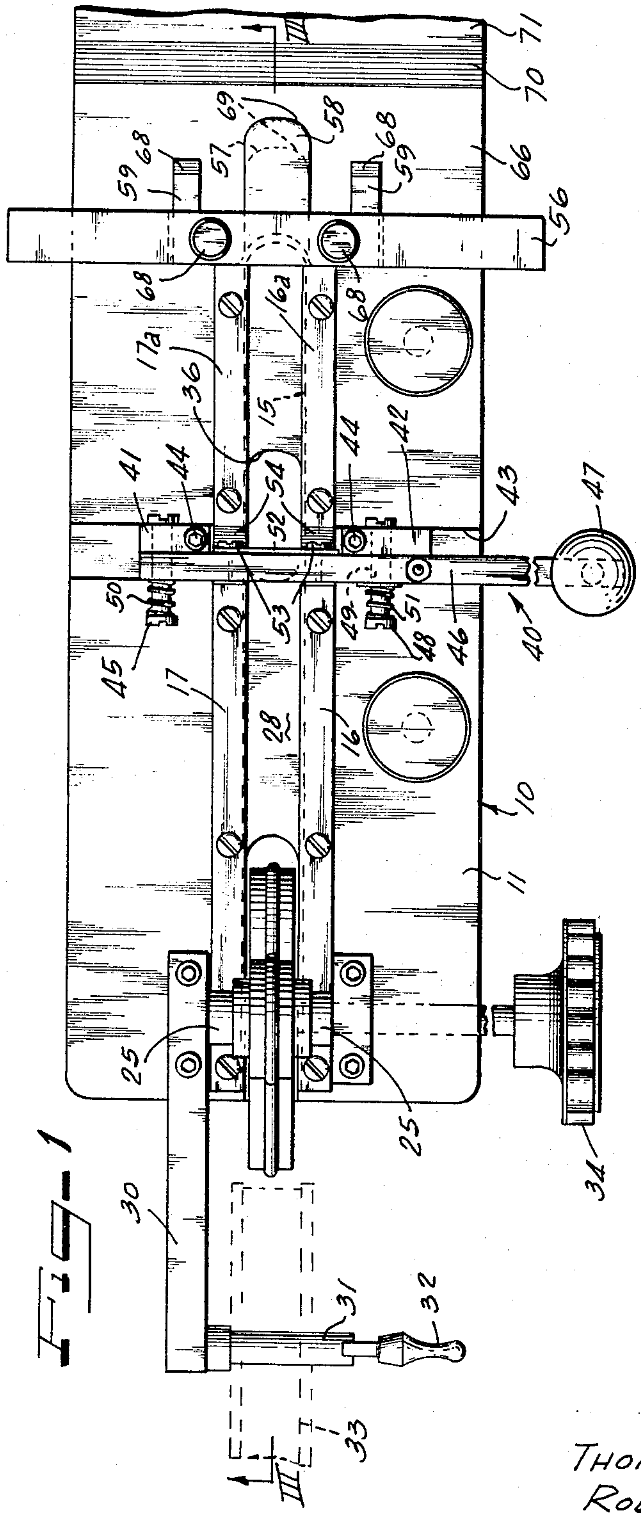
FIGURE 1 is a plan view of a film mounting assembly constructed in accordance with the principles of the present invention.
Figure 2:
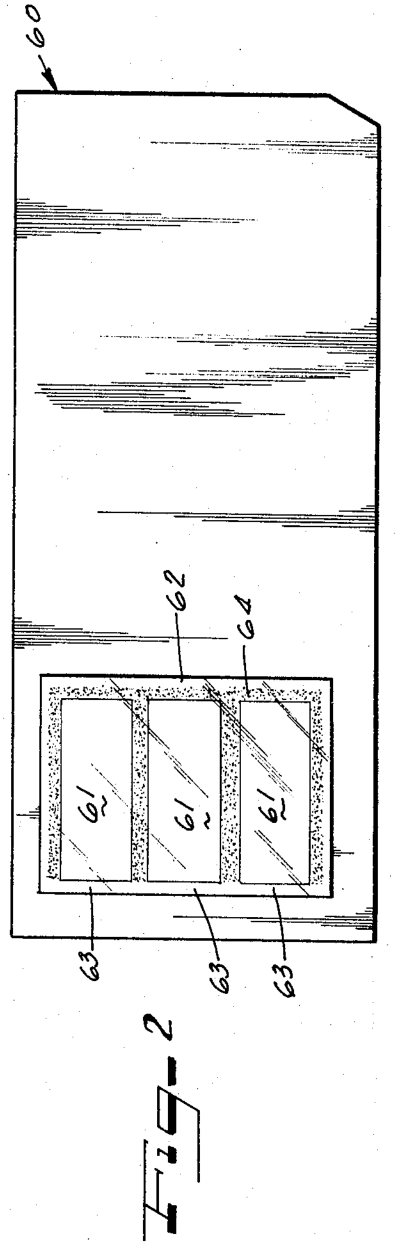
FIGURE 2 is a plan view of a film record card such as might be used with the mounting assembly illustrated in FIGURE 1.

Referring now briefly to FIGURE 2, there is shown a typical film record card 60 which has three film pockets 61 formed in the left handmost end thereof. It will be understood that there is a transparent enveloping member completely overlying all three apertures on the undersurface (reverse side) of the card 60 and that this enveloping member is sealed about all four sides of each of the three apertures to positively seal the pocket 61 against the entrance of any foreign matter from the reverse side of the card. The front or upper surface of the card has a transparent enveloping member 62, like the enveloping member on the opposite side of the card, completely overlying all three apertures as shown in the drawing. However, on the front or upper surface of the card the enveloping member is sealed about the side and right hand end edge only of all three apertures so that an unsecured edge 63 of the enveloping member overlaps but is not adhered to the mating surface of the card. The stippled marking in the drawing as shown at 64 indicates the adhesive which serves to hold the enveloping member in position and it will be observed that there is no adhesive beneath the unsecured edges 63. An access opening to each of the pockets 61 is thereby provided at the left handmost end of these apertures and film segments can be inserted through these access openings. The card illustrated in FIGURE 2 is designed to carry segments of 16 mm. microfilm and each aperture or pocket is designed to carry several cut film frame segments.

Sixteen mm. microfilm is presently manufactured with a thickness on the order of six mils or six one thousandths of an inch. The distance between the undersurface of the guideways 17, **17*a* and 16, 16*a*** is therefore only very slightly greater than the six mil thickness of the film.

The card hold-down arms 59 are readily flexible by the card as the card is moved onto the card support and yet they are strong enough to hold down the left handmost end of the record card when it is in its mounted position on the support. In this connection, it will be observed that the outermost ends 68 of the arms 59 are upturned to permit easy insertion of the card beneath the arms.

The lengths of the tongues 57, 58 are dictated by the positioning of the apertures or film pockets in the record cards to be used with the equipment. Such positioning is however now pretty much standard and the tongues are designed so that both of the tongues will lie within the film pockets during the film insertion operation.

As has already been noted, it is one of the principal objects of this invention to provide a film mounting assembly which will prevent the undesirable overriding of one film strip on another during the film insertion operation. This overriding is prevented in large measure by the careful construction of the tongues 57, 58. The tongues 57, 58 have a width substantially equal to or slightly less than the width of the film record pockets and each of the tongues has an end with rounded corners 69.

The basal end of the upper tongue 58 may be elevated very slightly above the plane of the film leaving the guideway 28 by the shims already referred to so that the upper tongue 58 may slant somewhat downwardly to a very small degree from its basal point to its distal end although such mounting is not essential. The upper tongue most preferably has a thickness of approximately six mils but the lower tongue has a thickness of less than that of the upper tongue (in this case less than six mils), and preferably on the order of four mils. Each tongue has its outer exposed, distal end chamfered or bevelled to facilitate insertion of the tongue beneath the unsecured edge of an enveloping member on a record card.

When the tongues are inserted into a record card the enveloping member of the record card will serve to move the tongues into a contact with one another. Depression of the lever 40 with the film strip properly positioned will be effective to cut one or more frames of film from the film roll and subsequent rotation of the knob 34 will act to move the film strip along the film guideway 28 and this film strip movement will act to push the cut film segment along in front of the film strip. The cut film segment will thereby be moved through the passage formed intermediate the two tongues and such movement will act to spread the tongues apart to permit the film segment to move through. As has already been noted, with the upper tongue having a thickness of six mils and the lower tongue having a thickness preferably on the order of four mils, the lower tongue, being thinner and formed of the same stock, will tend to flex away from the upper tongue and hence down into the film pocket.

The thickness of a standard film record card is approximately seven mils and it will therefore be apparent that if the end of the lower tongue flexes down into the aperture at least one mil or more, then overriding of one film segment on another will be effectively prevented inasmuch as the following film segment or strip of microfilm will still be in engagement with the cut film segment even after the cut film segment has dropped off the end of the lower tongue.

The configuration of the card support can be of considerable aid in insuring the proper functioning of the apparatus and to this end the end of the card bed adjacent and underlying the tongues 57, 58 is recessed as has been noted but is inclined upwardly as at 70 to a flat surface 71 which is substantially coplanar with the plane of the film guideway 28. Such an arrangement cants the record card downwardly at an angle somewhat (however slightly) to insure that the outermost end of the lower tongue 57 will be positioned quite close to the lowermost enveloping member of a record card mounted on the mounting assembly.

As has already been observed, the outermost ends of the tongues 57, 58 are rounded. Such rounding facilitates insertion of the tongues through the access opening of film record card pockets. In addition, however, rounding of the distal end of the lower tongue so that the greatest length of the tongue lies along the longitudinal axis thereof, serves another important function.

Bearing in mind that the lower tongue has a width equal to or very slightly greater than the width of the microfilm, it will be observed that the outer edges of the leading end of the "pusher" film strip will fall off the rounded corner edges of the lower tongue before the center of the trailing edge of the "pushed" film segment drops off the tongue into the film pocket. By such means constant contact between the mating edges of the "pusher" film strip and the "pushed" film segment is assured.

FIGURE 5 illustrates the undesirable overriding of one cut film segment on another when an appartus is employed without the mounting tongues heretofore described. In this case, again, the card has a thickness of approximately seven mils, the film has a thickness of approximately six mils, and it will be observed that when the cut film segment passes the left handmost edge of the aperture, it drops into the pocket below the plane of the upper surface of the card and the following or pusher film segment then overrides the first film segment. The mechanism constructed in accordance with the principles of our invention effectively obviates this disadvantageous feature and provides an improved and efficient film mounting assembly.

While this disclosure has been directed to a means for mounting film segments in film record cards per se, it will be understood that the mounting assembly herein described and hereafter claimed can be employed to advantage in mounting film segments in the pockets of so-called film jackets and the like, too, and it is to be understood that the term "film record cards" is herein used in that generic sense.

The embodiment of the invention herein described has been used for illustrative purposes only and it will be understood that various modifications and variations in the invention may be effected without departing from the spirit and scope of the novel concepts thereof.

What we claim is:

1. A film mounting assembly for mounting cut microfilm segments in record card pockets, wherein the card pockets are defined by a pair of enveloping members positioned on opposite surfaces of a record card and over an aperture formed therein, the improved mounting assembly comprising:
- a card support and a film support,
- means providing a film guideway on said film support for guiding film for movement along said film support,
- upper and lower film guide tongues extending from said film support in juxtaposition to one another whereby to define a film passage therebetween forming an extension of said film guideway,
- wherein said tongues extend over said card support in proximity thereto and are positionable within the pocket of a record card carried by said card support, and
- wherein said lower tongue is flexible and can be flexed by movement of film between said tongues and wherein said lower tongue is relatively more flexible than said upper tongue.

2. A film mounting assembly constructed in accordance with claim 1
- wherein the plane of said card support just outwardly of the outermost end of said tongues is raised at least as high as the plane of said film guideway.

3. A film mounting assembly constructed in accordance with claim 1
- wherein the surface of said card bed underlying said tongues is recessed below the immediately adjacent end of said film guideway a distance approximately equal to the thickness of a record card, and
- wherein the plane of said card support just outwardly of the outermost end of said tongues is raised at least as high as the plane of said film guideway.

4. A film mounting assembly constructed in accordance with claim 3
- wherein said upper tongue is longer than said lower tongue and each of said tongues terminates in generously rounded end portions chamfered along their exposed outer edges to insure proper insertion between an unsecured edge of an enveloping member and the adjacent underlying surface of a record card.

5. A film mounting assembly constructed in accordance with claim 1
- wherein said upper tongue is longer than said lower tongue and each of said tongues terminates in a generously rounded end portion chamfered along its exposed outer end edge to insure proper insertion between an unsecured edge of an enveloping member and the adjacent underlying surface of a record card.

6. A film mounting assembly constructed in accordance with claim 1
- wherein said upper tongue is longer than said lower tongue and each of said tongues terminates in a generously rounded end portion chamfered along its exposed outer end edge to insure proper insertion between an unsecured edge of an enveloping member and the adjacent underlying surface of a record card, and
- wherein the surface of said card bed underlying said tongues is recessed below the immediately adjacent end of said film guideway a distance approximately equal to the thickness of a record card and wherein the plane of said card support just outwardly of the outermost end of said upper tongue is raised at least as high as the plane of said film guideway.

7. A film mounting assembly constructed in accordance with claim 1
- wherein said tongues are formed of like stock with the main body of said upper tongue being at least six mils thick and main body of said lower tongue being less than six mils thick to provide the relatively greater flexibility for said lower tongue.

8. A film mounting assembly constructed in accordance with claim 7
- wherein said upper tongue is longer than said lower tongue and each of said tongues terminates in a generously rounded end portion chamfered along its exposed outer end edge to insure proper insertion between an unsecured edge of an enveloping member and the adjacent underlying surface of a record card, and
- wherein the surface of said card bed underlying said tongues is recessed below the immediately adjacent end of said film guideway a distance approximately equal to the thickness of a record card and wherein the plane of said card support just outwardly of the outermost end of said tongue is raised as least as high as the plane of said film guideway.

9. A film mounting assembly constructed in accordance with claim 1
- wherein said lower tongue has a width approximately equal to the width of the film and has its outer end edge tapered back from the center axis of said lower tongue to each of the side edges thereof.

10. A film mounting assembly for mounting cut microfilm segments in record card pockets, wherein the card pockets are defined by upper and lower enveloping members mounted on the upper and lower surfaces, respectively, of a record card and over an aperture formed within the card, the improved mounting assembly comprising:
- a card support and a film support,
- means providing a film guideway on said film support for guiding film for movement along said film support,
- upper and lower film guide tongues extending from said film support in juxtaposition to one another whereby to define a film passage therebetween forming an extension of said film guideway,
- wherein said tongues extend over said card support in proximity thereto and are positionable through an access opening to a card pocket formed intermediate the upper surface of a record card and the adjacent overlying unsecured edge of the uppermost enveloping member when said record card is positioned on said card support,
- means engageable with a film segment for moving said film segment along said guideway and through said film passage into the pocket of a record card positioned on said card support, and
- means positioning the end of said lower tongue lying within said card pocket in juxtaposition to the lower enveloping member of said record card and spaced from the enveloping member a distance less than the thickness of the film segment being forced through said film passage.

11. A film mounting assembly constructed in accordance with claim 10 wherein said lower tongue has a width approximately equal to the width of the film and has its outer end edge tapered back from the center axis of said lower tongue to each of the side edges thereof.

12. A film mounting assembly for mounting cut microfilm segments in record card pockets, wherein the card pockets are defined by upper and lower pocket-forming members, the improved mounting assembly comprising:

a card support and a film support, means providing a film guideway on said film support for guiding film for movement along said film support, a guide tongue extending from said film support whereby to define a continuation of the base of said film guideway, wherein said guide tongue extends over said card support in proximity thereto, an upper tongue extending from said film support in juxtaposition to said guide tongue to define a film passage between said tongues constituting an extension of said film guideway and wherein both of said tongues are positionable within the access opening of a film pocket to facilitate placement of a film segment therein, means engageable with a film segment for moving said film segment along said guideway and between said tongues into the pocket of a record card positioned on said card support, and means positioning the end of said guide tongue lying within said card pocket in juxtaposition to the lower pocket-forming member of said record card and spaced from that pocket-forming member a distance less than the thickness of the firm segment being forced through said film passage.

13. A film mounting assembly constructed in accordance with claim 12 wherein:

said upper tongue is longer than said lower tongue and said lower tongue is formed of stock flexible enough to permit of flexing said lower tongue by a film segment.

14. A film mounting assembly constructed in accordance with claim 12 wherein:

said upper tongue is longer than said lower tongue and said lower tongue is formed of stock flexible enough to permit of flexing said lower tongue by a film segment and wherein the distal end of said lower tongue has a width substantially less than the width of the film segment.

References Cited

UNITED STATES PATENTS 2,892,295 6/1959 McArthur ---------- 53—123

TRAVIS S. McGEHEE, *Primary Examiner.*

E. F. DESMOND, *Assistant Examiner.*

U.S. Cl. X.R.

53—123